United States Patent
Suigetsu et al.

(10) Patent No.: US 8,817,399 B2
(45) Date of Patent: Aug. 26, 2014

(54) LENS BARREL AND LENS ASSEMBLY

(71) Applicant: Olympus Corporation, Tokyo (JP)

(72) Inventors: Naoki Suigetsu, Tokyo (JP); Hitoshi Yamazaki, Tokyo (JP); Mitsuhiro Iwase, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/916,940

(22) Filed: Jun. 13, 2013

(65) Prior Publication Data

US 2013/0279032 A1    Oct. 24, 2013

Related U.S. Application Data

(63) Continuation of application No. PCT/JP2012/053504, filed on Feb. 15, 2012.

(30) Foreign Application Priority Data

Feb. 22, 2011   (JP) ................... 2011-035755

(51) Int. Cl.
G02B 7/02    (2006.01)

(52) U.S. Cl.
CPC .............. G02B 7/022 (2013.01); G02B 7/026 (2013.01)
USPC ....................................... 359/827

(58) Field of Classification Search
USPC ........................................ 359/827
See application file for complete search history.

(56) References Cited

U.S. PATENT DOCUMENTS

2010/0165491 A1*   7/2010   Chen et al. ............. 359/819

FOREIGN PATENT DOCUMENTS

| JP | 05-113529 A | 5/1993 |
| JP | 08-054552 A | 2/1996 |
| JP | 2007-203625 A | 8/2007 |

OTHER PUBLICATIONS

International Search Report issued for PCT/JP2012/053504, maililng date May 22, 2012.

* cited by examiner

*Primary Examiner* — James Jones
(74) *Attorney, Agent, or Firm* — Dickstein Shapiro LLP

(57) ABSTRACT

This lens barrel includes a lens-receiving surface that extends in an intersection direction intersecting the central axis; a side frame portion that is arranged further outward than the lens-receiving surface in the intersection direction and that protrudes in the direction of the central axis from the lens-receiving surface; and a plurality of caulking portions that are formed at a tip portion of the side frame portion in the protruding direction and are deformed by external pressure to caulk and fix a lens between the caulking portions and the lens-receiving surface. The lens-receiving surface is formed so as to be axisymmetrical to the central axis.

6 Claims, 15 Drawing Sheets

LENS BARREL AND LENS ASSEMBLY

This application is a continuation application based on a PCT Patent Application No. PCT/JP2012/053504, filed Feb. 15, 2012, whose priority is claimed on Japanese Patent Application No. 2011-035755, filed in Japan on Feb. 22, 2011. The contents of both the PCT Application and the Japanese Application are incorporated herein by reference.

BACKGROUND OF THE INVENTION

1. Field of the Invention

The present invention relates to a lens barrel and a lens assembly.

2. Background Art

In the related art, for example, in optical instruments, such as a camera, a lens assembly in which optical elements, such as a lens, are fixed to a lens barrel, which is formed from a thermoplastic resin by heat caulking, is used.

For example, Japanese Unexamined Patent Application, First Publication No. 2007-203625 discloses, as such a lens barrel, a lens frame that is formed in a substantially cylindrical shape from a plastic material and includes a lens insertion frame portion and caulking portions. The lens insertion frame portion is formed in a concave portion at one end opening of a substantially cylindrical shape that constitutes the lens frame, the lens is inserted into the end opening, and the lens is positioned in the direction of an optical axis. All four caulking portions protrude from the top face of the peripheral edge of the lens inserted into the lens insertion frame portion around the end opening, and are formed in the shape of projections at predetermined intervals. Additionally, Japanese Unexamined Patent Application, First Publication No. 2007-203625 discloses a lens assembly in which the peripheral edge of the lens is fixed by heat-deforming the caulking portions after the lens is inserted into this lens frame.

Additionally, in a lens assembly that requires high precision, it is well known to provide a caulking portion at the whole periphery of a lens outer edge to firmly fix the lens so that the lens is prevented from moving in the range of a gap from a lens insertion frame portion due to vibration or the like. In recent years, particularly, demands for a larger number of pixels or size reduction of a camera or the like have become stronger. In order to achieve these demands, a higher precision of the fixing precision between the lens and the lens frame is required. Moreover, in order to achieve size reduction and effectively utilize barrel space, a lens having cutouts, such as a D-cut shape, is often used.

Usually, if high precision is not needed in caulking fixation, even in the caulking of such a D-shaped lens, a caulking portion is provided on an overall circular-arc portion out of the outer edge of the lens as in a circular lens, and caulking fixation of the lens is performed. However, if this structure is given, eccentricity in which the lens is apt to move to the side with no caulking portion is readily caused due to a pressing force that acts through the caulking portion during heat caulking. As a measure for high precision for suppressing this eccentricity, in the related art, caulking portions are provided at positions that face each other across the optical axis and the D-cut portion of the lens.

An example of the shape of such a related-art lens assembly is shown in FIGS. 10A, 10B, 10C, and 10D. FIG. 10A is a schematic perspective view showing an example of the configuration of the lens assembly of the related art. FIG. 10B is a plan view as seen from a in FIG. 10A. FIGS. 10C and 10D are a b-b cross-sectional view and a c-c cross-sectional view in FIG. 10B.

A lens assembly 100 is an assembly fixed by heat-caulking a lens 101 to a lens barrel 102. The lens 101 is constituted by a cylindrical lens side surface 101e, and a D-cut surface 101d formed of a plane parallel to an optical axis o.

The lens 101 is a negative meniscus lens including a first lens surface 101a formed of a convex spherical surface, and a second lens surface 101b formed of a concave spherical surface. An attachment reference surface 101c for positioning the lens 101 in the direction of the optical axis is formed on the outer edge side of the second lens surface 101b. The attachment reference surface 101c is a plane orthogonal to the optical axis o.

The lens barrel 102 includes a lens-receiving surface 102a that causes the attachment reference surface 101c of the lens 101 to abut against one end portion of a substantially cylindrical cylinder portion 102b including a through hole 102e at the center thereof.

The lens-receiving surface 102a is a plane orthogonal to a central axis p of the cylinder portion 102b, and is formed at a flange portion that extends radially outward at one end of the cylinder portion 102b. Here, the side surface of the flange portion is constituted by a cylindrical surface and a D-cut surface 102f and is formed with almost the same D shape as the outer shape of the attachment reference surface 101c of the lens 101.

Frame portions 102c having a pair of partial cylindrical surfaces that are gently fitted thereto by inserting the lens side surface 101e of the lens 101 extend in the direction of the optical axis o on an outer edge portion of the lens-receiving surface 102a.

The pair of frame portions 102c are arranged to face each other across the optical axis o, and cover the lens side surface 101e with central angle sizes of 90°, respectively. For this reason, the pair of frame portions 102c are arranged so as to be plane-symmetrical with respect to a plane s (refer to FIGS. 10B and 10C) and a plane t (refer to FIG. 10B and FIG. 10D) or become 180° axisymmetrical with respect to the central axis p. The plane s, as shown in FIGS. 10B and 10C, is a plane that passes through the central axis p and line c-c of the cylinder portion 102b, and is orthogonal to the D-cut surface 102f. The plane t, as shown in FIGS. 10B and 10D, is a plane that passes through the central axis p and is orthogonal to the plane s.

Additionally, tip portions of the frame portion 102c are thermally deformed by a heat-caulking apparatus after the lens 101 is inserted into the frame portions 102c. Caulking and fixing portions 102d are formed that bias the outer edge portion of the first lens surface 101a in the direction of the optical axis o and hold the lens 101.

In this way, in the lens assembly 100, the lens 101 is pinched in the direction of the optical axis o between the lens-receiving surface 102a and the caulking and fixing portions 102d. Thereby, the attachment reference surface 101c is pressed against and fixed to the lens-receiving surface 102a.

However, the present applicant has discovered from an experimental study that there are the following problems in a lens frame shape, particularly, in the shape of the lens receiving surface of the lens frame, in order to caulk and fix such a D-cut lens with higher precision.

In a case where the lens 101 is a heat caulking to the lens barrel 102 described above to form the lens assembly 100, the lens 101 is pressed against and fixed to the lens-receiving surface 102a side, with the thermal deformation of the caulking and fixing portions 102d. At this time, a pressing force that acts on the lens 101 from the first lens surface 101a side is a force that is plane-symmetrical with respect to the planes s and t, respectively. Thereby, the eccentricity of the lens 101 is reduced compared to a case where a caulking portion is formed in the shape of the letter C. For example, the average of the eccentricity can be about 5 μm.

SUMMARY OF THE INVENTION

According to a lens barrel related to a first aspect to the present invention, there is provided a lens barrel that has a reference surface formed in a circular-arc shape and a first side surface formed in a cutout shape and fixes a lens such that an optical axis is lined along a central axis. The lens barrel includes a lens-receiving surface that extends in an intersection direction intersecting the central axis; a side frame portion that comes in contact with the lens-receiving surface in the intersection direction and that protrudes in a direction of the central axis from the lens-receiving surface; and a plurality of caulking portions that are formed at a tip portion of the side frame portion in a protruding direction and are deformed by external pressure to caulk and fix the lens between the caulking portions and the lens-receiving surface. The lens-receiving surface is formed so as to be axisymmetrical to the central axis.

According to a second aspect of the present invention, in the above first aspect, the lens-receiving surface may be formed in a shape of a closed loop around the central axis.

According to a third aspect of the present invention, in the above first aspect, a plurality of the lens-receiving surfaces may be formed at positions that face each other across the central axis.

According to a fourth aspect of the present invention, in any one aspect of the above first to third aspects, a reference surface of the circular-arc shape may be formed in a major arc shape.

According to a fifth aspect of the present invention, in any one aspect of the above first to fourth aspects, an outer peripheral surface of the side frame portion may be bent in a circular-arc shaped that is coaxial with the central axis and a pair of the side frame portions may be arranged to face each other across the central axis, and a second side surface formed opposite to the cutout-shaped first side surface across the central axis may be bent in a circular-arc shaped that is coaxial with the outer peripheral surface of the side frame portion and has a same diameter as the side frame portion.

According to a sixth aspect of the present invention, in any one aspect of the above first to fifth aspects, the lens may be fixed by being formed from a thermoplastic resin and heat-caulking the caulking portion.

According to a lens assembly related to a seventh aspect of the present invention, there is provided a lens assembly including the lens barrel according to any one of the first to sixth aspects, and a lens. An outer shape of the lens seen from a direction along the optical axis is formed by a circular-arc shape and a linear shape, and the lens is caulked and fixed by the caulking portions of the lens barrel.

BRIEF DESCRIPTION OF DRAWINGS

FIG. 10A is seen from a.

DESCRIPTION OF EMBODIMENTS

A lens barrel and a lens assembly related to an embodiment of the present invention will be described.

Figure 1A:
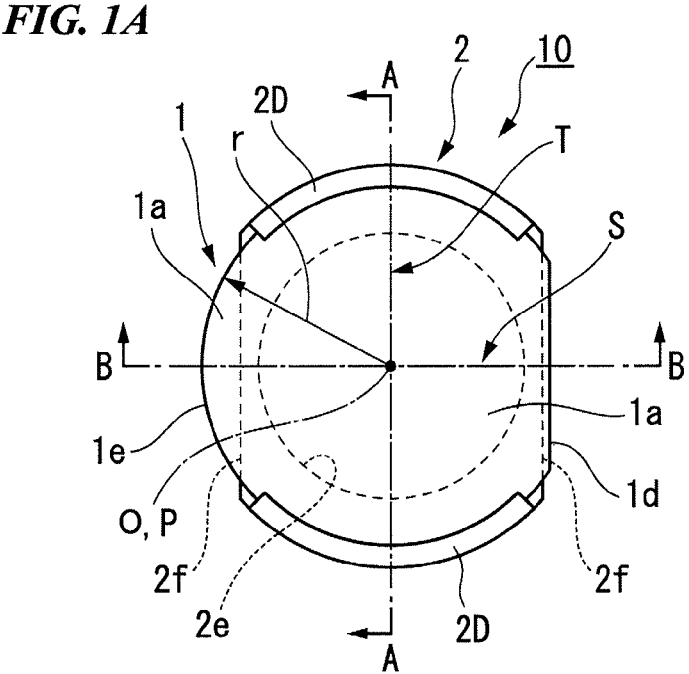
FIG. 1A is a schematic plan view showing the configuration of a lens assembly related to an embodiment of the present invention.
Figure 1B:
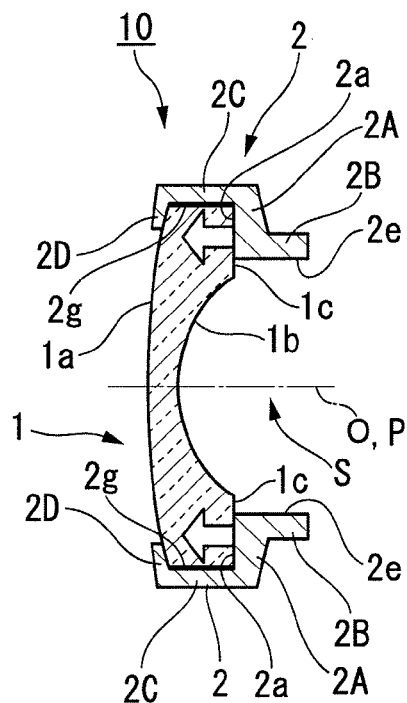
FIG. 1B is an A-A cross-sectional view of FIG. 1A.
Figure 1C:
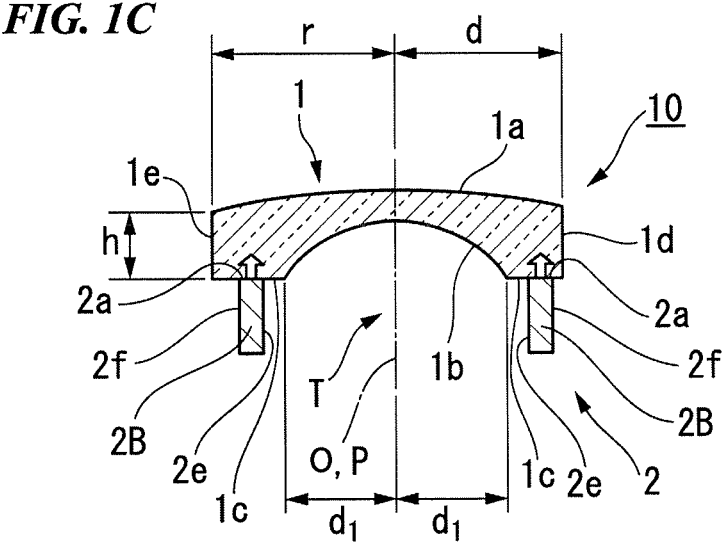
FIG. 1C is a B-B cross-sectional view of FIG. 1A.
Figure 2A:
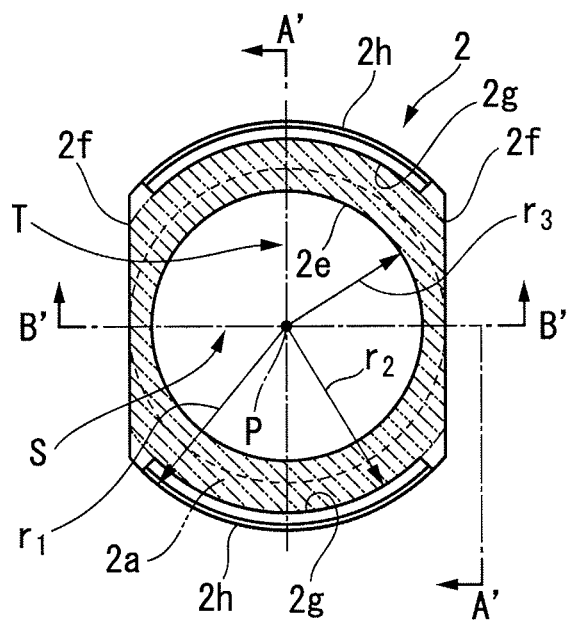
FIG. 2A is a schematic plan view showing the configuration of a lens barrel related to the embodiment of the present invention.
Figure 2B:
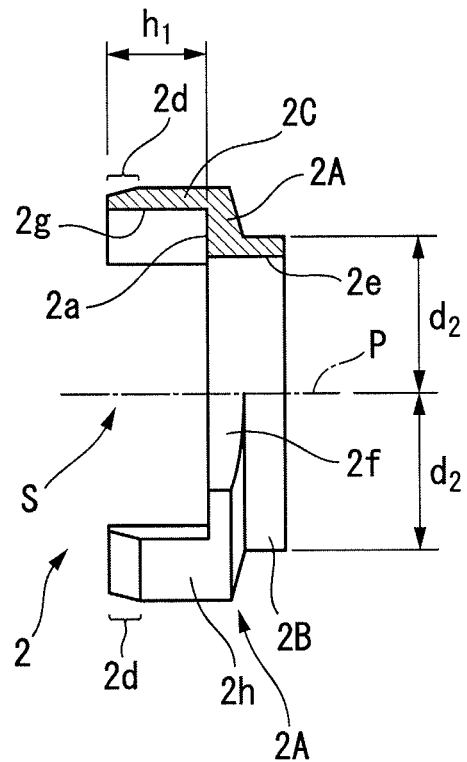
FIG. 2B is an A'-A' cross-sectional view of FIG. 2A.
Figure 2C:
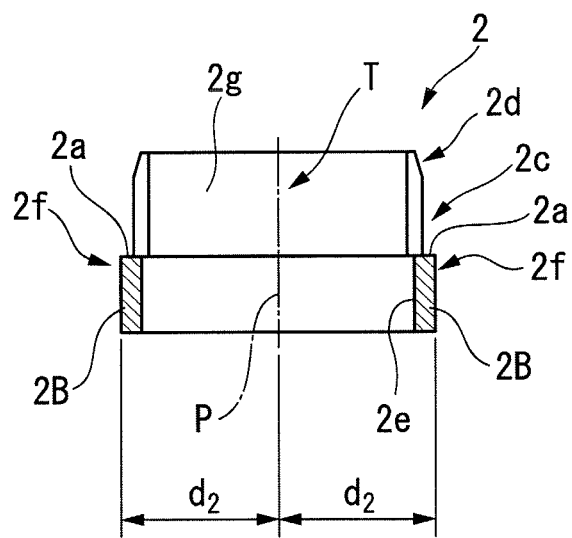
FIG. 2C is a B'-B' cross-sectional view of FIG. 2A.

FIG. 1A is a schematic plan view showing the configuration of the lens assembly related to the embodiment of the present invention. FIG. 1B and FIG. 1C are an A-A cross-sectional view and a B-B cross-sectional view in FIG. 1A, respectively. FIG. 2A is a schematic plan view showing the configuration of the lens barrel related to the embodiment of the present invention. FIG. 2B and FIG. 2C are an A'-A' cross-sectional view and a B'-B' cross-sectional views in FIG. 2A, respectively.

The lens assembly 10 of the present embodiment, as shown in FIGS. 1A, 1B, and 1C, is an assembly in which a lens 1 whose outer shape seen from a direction along an optical axis is formed by a circular-arc shape and a linear shape is a heat caulking in the thickness direction at an outer edge portion thereof and is fixed to a lens barrel 2. Caulking and fixing portions 2D are portions of the lens barrel 2 after being thermally deformed by heat caulking.

The lens assembly 10 constitute a lens unit by alone or in combination with another lens assembly. For example, the lens assembly can be used as lens units, such as an imaging optical unit, a projection optical unit, and a reading optical unit, in optical instruments, such as a still camera, a video camera, a projector, and a scanner.

Although an appropriate shape can be used as the shape of the lens surface of the lens 1 if needed, the case of a negative meniscus lens including a first lens surface 1a having a convex spherical surface and a second lens surface 1b having a concave spherical surface will be described below as an example.

The outer shape of the lens 1 seen from the direction along the optical axis O is formed in a D-shape having a major arc shape portion and a linear shape portion. The side surface of the lens 1 includes a lens side surface 1e corresponding to the major arc shape portion and a D-cut surface 1d corresponding to the linear shape portion.

The lens side surface 1e constitutes a reference outer shape of the lens 1, and is a partial cylindrical surface with a radius r. The partial cylindrical surface is formed with high precision so as to be coaxial with the optical axis O. For this reason, the lens side surface 1e can be used for the radial positioning of the lens 1.

The D-cut surface 1d has a shape provided to avoid interference with other parts when being attached to an optical instrument using the lens assembly 10, and is a plane parallel to the optical axis O.

The distance d (where d<r) between the D-cut surface 1d and the optical axis O can be set to an appropriate dimension if needed.

The first lens surface 1a, as shown in FIG. 1A, intersects the lens side surface 1e and the D-cut surface 1d at the outer edge portion thereof.

The second lens surface 1b is formed to be coaxial with the first lens surface 1a within a range of a circular shape with a radius $d_1$ (where $d_1$<d) on the rear surface side of the first lens surface 1a.

As shown in FIG. 1B, the attachment reference surface 1c is formed from the outer periphery of the second lens surface 1b to the lens side surface 1e and the D-cut surface 1d. The attachment reference surface 1c is constituted by a plane, orthogonal to the optical axis O, in which the distance from the top of the first lens surface 1a is set to a constant value. That is, in the present embodiment, the attachment reference surface 1c is a closed-loop-shaped plane that is continuous in the circumferential direction.

In the following, as shown in FIG. 1C, the length of the lens side surface 1e in the direction along the optical axis O, that is, the distance from the attachment reference surface 1c to the outer periphery of the first lens surface 1a is expressed by h, and is referred to as the edge thickness h of the lens 1.

As the material of the lens 1, appropriate optical glass can be used as a material of the lens 1 so that the first lens surface 1a and the second lens surface 1b may not be deformed by heat caulking. Machining or glass molding can be used as a manufacturing method of the lens 1.

In the present embodiment, the lens barrel 2 has a reference surface that is formed in a circular-arc shape having a maximum radius in a direction orthogonal to a central axis P, and a planar side surface 2f (first side surface) formed in a cutout shape smaller than the maximum radius, and fixes the lens with the optical axis being made to run along the central axis P. A specific configuration will be described below.

The lens barrel 2, as shown in FIGS. 2A, 2B, and 2C, includes a cylindrical cylinder portion 2B that has a through hole 2e with a radius $r_3$ formed at a central portion thereof, a pair of flange portions 2A extending to both outward sides along one radial direction from one axial end of the cylinder portion 2B, and lens insertion frame portions 2C (side frame portions) that have a partial cylindrical shape extending opposite to the cylinder portion 2B in the axial direction from the outer edge portions of the respective flange portions 2A in order to externally fit to the lens side surface 1e of the lens 1.

In the present embodiment, the external radius $d_2$ of the cylinder portion 2B is set to a size that satisfies $d_1 < r_3 < d_2 < d$.

The outer shape of the pair of flange portions 2A in plan view has a shape surrounded by the planar side surfaces 2f and partial cylindrical surfaces. The planar side surfaces 2f are constituted by two parallel planes (a first side surface and a second side surface) aligned with the outer shape of the cylinder portion 2B and having the central axis P interposed therebetween.

Additionally, the first side surface and the second side surface are bent in a circular-arc shape that is coaxial with and has the same diameter as the side frame portions 2C. Additionally, the partial cylindrical surfaces have a larger radius $r_1$ than the outer radius r of the lens side surface 1e in a direction orthogonal to the facing direction of the planar side surfaces 2f. In the present embodiment, the planar side surfaces 2f are formed with high precision in the distance and parallelism to the central axis P, and can also be used as reference surfaces of attachment or assembly when the lens assembly 10 is attached to an optical instrument.

The surfaces (also including regions that overlap the tip of the cylinder portion 2B) of the flange portions 2A where the lens insertion frame portions 2C are provided are constituted by planes orthogonal to the central axis P. Particularly, the lens-receiving surface 2a that receives the attachment reference surface 1c of the lens 1 inserted between the respective lens insertion frame portions 2C is formed within a circle with a radius $r_2$ (where $r<r_2<r_1$) centered on the central axis P.

The lens insertion frame portions 2C extend from cylindrical outer edge portions of the flange portions 2A, and have a substantially circular-arc plate shape that is plane-symmetrical with respect to a plane S passing through the central axis P and orthogonal to the planar side surfaces 2f.

The circumferential lengths of the respective lens insertion frame portions 2C are equally set to the length of circular arcs whose central angles to the central axis P are 90°, respectively.

Insertion surfaces 2g that have a pair of partial cylindrical surfaces to which the lens side surface 1e is externally fitted by gap fitting is formed in a positional relationship of being coaxial with the central axis P, on the inner peripheral sides of the lens insertion frame portions 2C. The curvature radius of the insertion surfaces 2g is defined as a radius $r_2$. The gap between the insertion surfaces 2g and the outer radius r of the lens side surface 1e is preferably equal to or less than about 50 μm.

Frame portion outer peripheral surfaces 2h that are partial cylindrical surfaces coaxial with the central axis P are respectively formed on the outer peripheral sides of the lens insertion frame portions 2C. In the example of the present embodiment, the frame portion outer peripheral surfaces 2h extend also to the sides of the flange portions 2A and serve also as the cylindrical outer peripheral surfaces of the flange portions 2A, and constitute the outermost peripheral surface of the lens assembly 10.

The frame portion outer peripheral surfaces 2h are molded so that the dimensional precision of a curvature radius, roundness, coaxiality with the central axis P, or the like may be excellent, and can be used as reference surfaces that perform positioning of the optical axis O of the lens assembly 10.

A plurality of caulking portions 2d are formed at tip portions of the lens insertion frame portions 2C in the direction along the central axis P in order to caulk the lens 1 at the outer edge portion of the first lens surface 1a in the thickness direction and to form the caulking and fixing portions 2D. The height of the caulking portions 2d measured along the central axis P from the lens-receiving surface 2a is provided in a range from h to h1 (where $h_1 > h$). The height $h_1$ of the tips of the caulking portions 2d is set to a dimension such that the caulking and fixing portions 2D formed by heat caulking can remain out of the lens effective region of the first lens surface 1a during heat caulking.

Additionally, the caulking portions 2d of the present embodiment are provided over the entire lens insertion frame portions 2C in the circumferential direction, for example, a tapered shape whose diameter decreases toward a tip is given to the outer peripheral surface of each caulking portion so as to make it easy to perform caulking.

By virtue of such a configuration, the outer shape of the lens barrel 2, as shown in FIG. 2A, has a shape surrounded by circular arcs with the radius $r_1$ corresponding to the frame portion outer peripheral surfaces 2h, and parallel cords corresponding to the pair of planar side surfaces 2f, as seen from the central axis P. That is, the outer shape of the lens barrel 2 has the frame portion outer peripheral surfaces 2h that are reference surfaces that are formed in a circular-arc shape with the radius $r_1$ that is a maximum radius in the direction orthogonal to the central axis P, and the planar side surfaces 2f that are side surfaces formed in a cutout shape smaller than the radius $r_1$. The "cutout shape" means that the planar side surfaces 2f recede further radially inward than the cylindrical surfaces extending from the frame portion outer peripheral surfaces 2h, and have a shape similar to one obtained by cutting out a columnar shape.

Additionally, the lens insertion frame portions 2C are arranged further outward than the lens-receiving surface 2a in an intersection direction intersecting the central axis P, and constitute the side frame portions protruding in the same direction as the central axis P from the lens-receiving surface 2a.

The pair of lens insertion frame portions 2C and a pair of caulking portions 2d face each other, respectively, across the central axis P and are provided in shapes and at positions that are plane-symmetrical with respect to a plane T including the central axis P and parallel to the planar side surfaces 2f.

Moreover, both the pair of lens insertion frame portions 2C and the pair of caulking portions 2d are respectively provided in shapes and at positions that are plane-symmetrical with respect to a plane S including the central axis P and orthogonal to the plane T.

Additionally, the lens-receiving surface 2a is formed as a continuous closed-loop-shaped region around the central axis P, and constitutes a region that is plane-symmetrical with respect to the planes T and S, respectively.

In this way in the present embodiment, the lens insertion frame portions 2C, the caulking portions 2d, and the lens-receiving surface 2a are formed in a plurality of regions plane-symmetrical with respect to the planes S and T. Thus, they are formed so as to be 180° axisymmetrical (rotationally symmetrical) with respect to the central axis P.

The barrel 2 of such a configuration can be manufactured by molding an appropriate thermoplastic resin, for example, polycarbonate resin, ABS resin (acrylonitrile-butadiene-styrene copolymer resin), or the like using molds.

Next, with regard to the operation of the lens barrel 2 of the present embodiment, the operation in the manufacturing process of the lens assembly 10 will be mainly described.

Figure 3A:
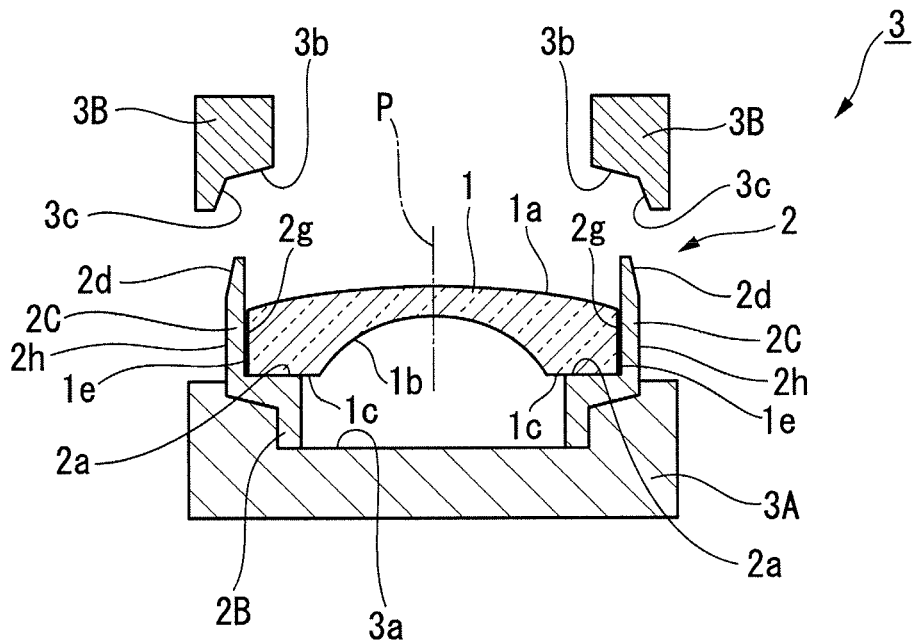
FIG. 3A is a schematic process explanatory view illustrating a manufacturing process of the lens assembly related to the embodiment of the present invention.
Figure 3B:
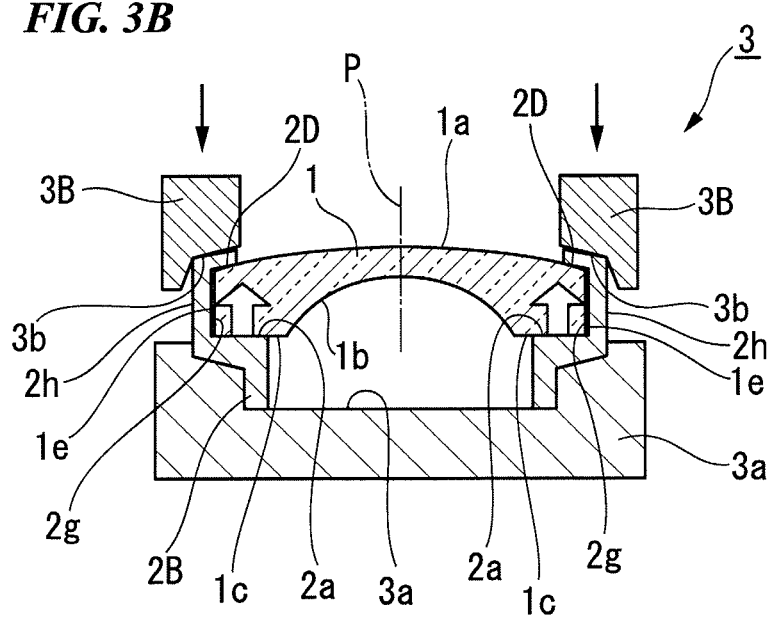
FIG. 3B is a schematic process explanatory view illustrating the manufacturing process of the lens assembly related to the embodiment of the present invention.

FIGS. 3A and 3B are schematic process explanatory views illustrating the manufacturing process of the lens assembly related to the embodiment of the present invention.

In order to assemble the lens 1 and the lens barrel 2 to manufacture the lens assembly 10, first, the lens barrel 2 is set in a heat-caulking apparatus 3 as shown in FIG. 3A.

The heat-caulking apparatus 3 includes a holding stand 3A and a heating head 3B. The holding stand 3A is provided with a holding portion 3a that holds the cylinder portion 2B from below with the caulking portions 2d of the lens barrel 2 directed upward. Additionally, the heating head 3B is liftably provided above the holding stand 3A, and the caulking portions 2d of the lens barrel 2 held by the holding portion 3a are thermally deformed inward toward the central axis P and downward to perform heat caulking.

The holding portion 3a aligns the central axis P with the reference position of the holding stand 3A in the horizontal direction, for example, by using the frame portion outer peripheral surfaces 2h of the lens barrel 2 for positioning.

Additionally, the heating head 3B includes a pressurizing surface 3b that is a circular-arc region that covers the caulking portions 2d of the lens barrel 2 held by the holding stand 3A, and its inner peripheral side, and pressurizes the caulking portions 2d downward and in a direction that imitates the inclination of the outer edge portion of the first lens surface 1a of the lens 1, and an outer peripheral regulating surface 3c that regulates deformation of the caulking portions 2d to the outer peripheral side when the caulking portions 2d are pressurized by the pressurizing surface 3b.

The temperature of the heating head 3B is set to a temperature where a synthetic resin that becomes the material of the lens barrel 2 softens to about 250° C., for example, in the case of polycarbonate resin.

Next, the lens 1 is inserted inside the lens insertion frame portions 2C of the lens barrel 2 held by the holding stand 3A.

As for the insertion posture of the lens 1, the lens is held in the positional relationship in which the attachment reference surface 1c faces the lens-receiving surface 2a of the lens barrel 2 and the D-cut surface 1d becomes substantially parallel to the planar side surface 2f of the lens barrel 2, and is inserted in a state where the lens side surface 1e is interposed by the pair of insertion surfaces 2g.

When the lens 1 is inserted, in the present embodiment, the lens is inserted by a transfer device (not shown), for example, a robot hand or an insertion jig so that the optical axis O of the lens 1 is substantially aligned with the central axis P. This can prevent the lens 1 from being inserted in a biased state within a range of a gap from the insertion surfaces 2g when the lens 1 is inserted.

For this reason, in the present embodiment, the lens 1 is inserted in a state where there is a substantially uniform gap between the lens side surface 1e and the insertion surfaces 2g, and the attachment reference surface 1c is superimposed on the lens-receiving surface 2a.

Next, as shown in FIG. 3B, the heating head 3B heated to, for example, 250° C. is lowered according to the material of the lens barrel 2.

The caulking portions 2d that are heated and softened by the heating head 3B are pressurized downward by the pressurizing surface 3b in a state where falling deformation to the outer peripheral side is regulated by the outer peripheral regulating surface 3c, are bent to the inner peripheral side of the lens 1, and are gradually deformed toward the outer edge portion of the first lens surface 1a.

If the heating head 3B descends to a predetermined descent position, the thermally deformed caulking portions 2d are interposed between the outer edge portion of the first lens surface 1a and the pressurizing surface 3b, and adhere tightly to the outer edge portion of the first lens surface 1a. This forms the caulking and fixing portions 2D.

If the caulking and fixing portions 2D are plastically (permanently) deformed, and adhere uniformly and tightly to the first lens surface 1a, the pressurization by the heating head 3B is released, and the heating head 3B is retracted upward.

If the caulking and fixing portions 2D are cooled to some extent and the shape of the caulking and fixing portions 2D is stabilized, the lens barrel 2 to which the lens 1 is fixed is removed from the holding stand 3A. The lens assembly 10 is manufactured in this way.

In the process of performing the above heat caulking, the lens 1 is downward pressurized from the heating head 3B via the caulking and fixing portions 2D, and the lens-receiving surface 2a is pressed through the attachment reference surface 1c.

Since the lens-receiving surface 2a is spaced apart from the heating head 3B, softening caused by the influence of heat does not occur easily. Accordingly, the lens-receiving surface is substantially elastically deformed according to a pressing force because the lens-receiving surface has little deformation volume compared to the deformation of the caulking portions 2d but has low rigidity compared to glass. Additionally, the reaction force distribution according to a pressing force to the lens 1 from the lens-receiving surface 2a occurs.

In the present embodiment, the attachment reference surface 1c of the lens 1 has a shape that is plane-symmetrical with respect to a plane including the optical axis O and orthogonal to the D-cut surface 1d and that is asymmetrical with respect to a plane including the optical axis O and parallel to the D-cut surface 1d. In order to insert the lens 1 into the lens barrel 2 in a state where the optical axis O and the central axis P are substantially aligned with each other, the shape of a contact part between the attachment reference surface 1c and the lens-receiving surface 2a becomes plane-symmetrical with respect to the planes S and T and becomes 180° axisymmetrical with respect to the central axis P.

For this reason, the deformation of the lens-receiving surface 2a under pressurization and the reaction force distribution from the lens-receiving surface 2a also become plane-symmetrical with respect to the planes S and T and become 180° axisymmetrical with respect to the central axis P.

For example, as shown by a thick arrow in FIG. 3B, a comparatively large reaction force is generated symmetrically with respect to the plane S, on the lens-receiving surface 2a that faces the caulking and fixing portions 2D. On the other hand, in the lens-receiving surface 2a at positions apart from the caulking and fixing portions 2D, the caulking and fixing portions 2D are not located directly above the lens-receiving surface 2a. Therefore, the reaction force becomes small. However, as shown by a thick arrow in FIG. 1C, the reaction force distribution becomes symmetrical with respect to the plane T.

In this way, the lens 1 that receives the pressurization is pressed symmetrically with respect to the planes S and T, respectively, by the caulking and fixing portions 2D and the lens-receiving surface 2a, and the contact positions with the caulking and fixing portions 2D and the lens-receiving surface 2a and the deformation of the lens-receiving surface 2a also become symmetrical with respect to the planes S and T, respectively. Thereby, mechanical conditions regarding biaxial directions orthogonal to the planes S and T are symmetrical. Additionally, the mechanical conditions regarding the central axis P are rotationally symmetrical.

As a result, the balance of external forces that act on the lens 1 becomes excellent. Accordingly, if minute displacement based on individual differences, such as the minute shape errors of the lens 1 and the lens barrel 2, or accidental error factors, such as the operation variation of the heating head 3B, are removed, movement does not easily occur in a direction along the lens-receiving surface 2a such that the symmetric property with respect to a plane of symmetry or an axis of symmetry collapses while receiving pressurization.

For this reason, according to the lens barrel 2, the lens 1 can be fixed with high precision by caulking. Additionally, the eccentricity of the lens assembly 10 is suppressed and the optical performance of the lens unit using the lens assembly 10 becomes excellent.

Here, strictly, the optical axis O and the central axis P do not become perfectly plane-symmetrical geometrically in a case where these have deviated from each other. However, if the optical axis O and the central axis P vary approximately in a range of the gap between the lens side surface 1e and the insertion surfaces 2g, the asymmetry of the contact surface between the attachment reference surface 1c and the lens-receiving surface 2a is sufficiently small compared to the asymmetry of the shape of the attachment reference surface 1c. For this reason, a clear correlation is not seen between a direction in which the lens 1 is easy to move and a direction in which asymmetry is strong. Accordingly, a range larger than geometrically strict plane symmetry and axial symmetry is included in the range of the "plane symmetry" or "axial symmetry" in the present embodiment.

If the center of a figure of an "actual abutting surface" between the attachment reference surface 1c and the lens-receiving surface 2a is expressed as C, and the distance of the center C of the figure from the planes S and T is expressed as $C_S$ and $C_T$, respectively in order to specify the magnitude of the asymmetry, the ranges where $|C_S/r|$ and $|C_T/d|$ are each equal to or less than 5% are allowable ranges of asymmetry that may be regarded as the plane symmetry. Additionally, the allowable range of the axial symmetry is an allowable range of asymmetry that may be regarded as the axial symmetry if a value obtained by dividing the deviation amounts of the center of a figure to be symmetrical to each other when the "actual abutting surface" is symmetrically moved, by the radius r are equal to or less than 5% at the maximum.

This allowable range of the asymmetry can be applied not only to the asymmetry generated due to the error of the insertion position of the lens 1 but also to the asymmetry generated in the "actual abutting surface" due to the influence of the shape error of the lens-receiving surface 2a that is to be plane-symmetrical or axisymmetrical. That is, the lens-receiving surface 2a can be regarded as being symmetrical in the range where the "actual abutting surface" satisfies the allowable range of the asymmetry even if the lens-receiving surface 2a has asymmetry.

Figure 10A:
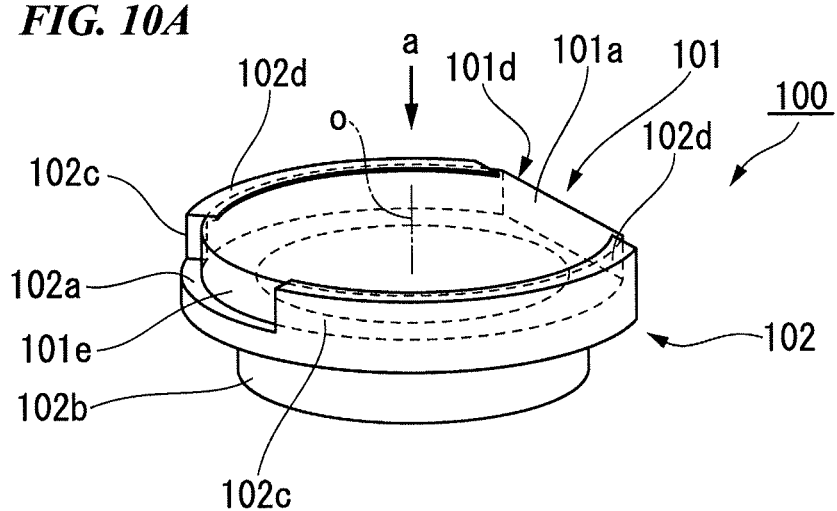
FIG. 10A is a schematic perspective view showing an example of the configuration of a lens assembly of the related art.
Figure 10B:
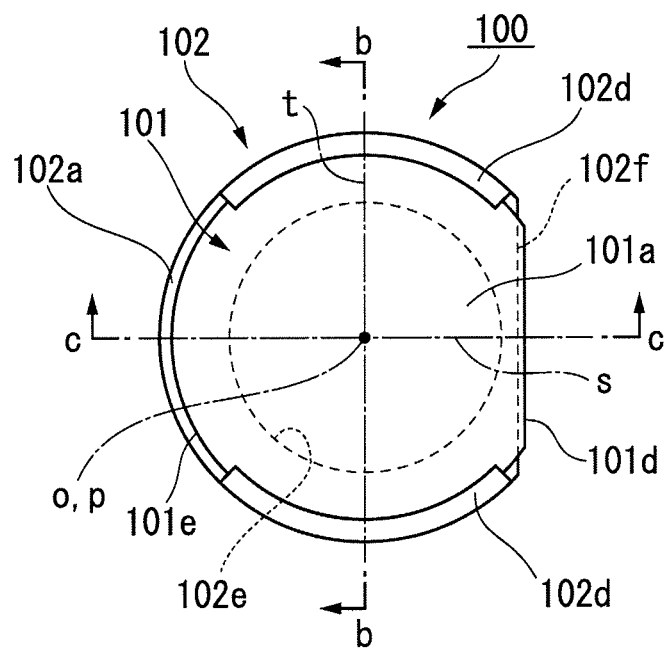
FIG. 10B is a plan view when
Figure 10C:
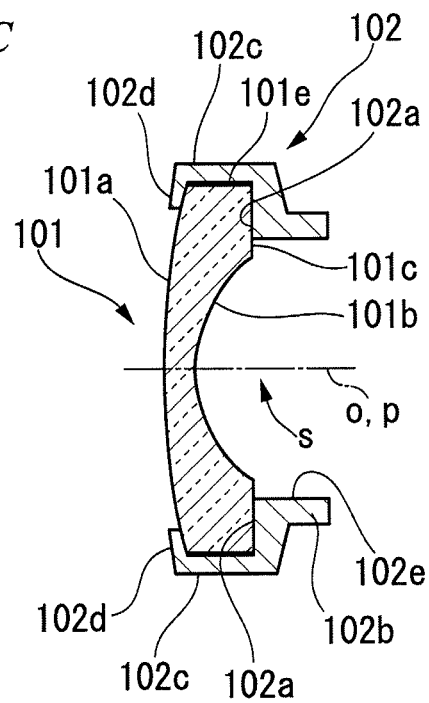
FIG. 10C is a b-b cross-sectional view of FIG. 10B.
Figure 10D:
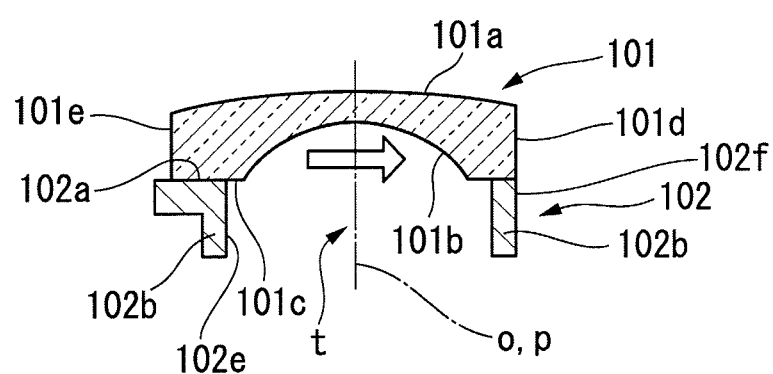
FIG. 10D is a c-c cross-sectional view of FIG. 10B.

In contrast, in a case where the attachment reference surface 101c and the lens-receiving surface 102a are symmetrical with respect to only the plane s as in an example shown in FIGS. 10B, 10C, and 10D, these surfaces are asymmetrical and are not axisymmetrical with respect to the plane t orthogonal to the plane s. Therefore, the deformation of the lens-receiving surface 102a and the reaction force distribution from the lens-receiving surface 102a also become asymmetrical with respect to the plane t and the central axis p. As a result, the lens 101 easily moves in the direction in which the D-cut surface 101d is provided while heat caulking is performed, and even if the optical axis o is aligned with the central axis p to start heat caulking, the lens 101 easily becomes eccentric in the direction of the D-cut surface 101d. For this reason, the optical performance of the lens unit using the lens assembly 100 will degrade.

For example, the average of the eccentricity is set to about 5 μm, for example, when the lens 1 is a heat caulking to such a lens barrel 102 of the related art and eccentricity is measured in a plurality of samples. In contrast, in a case where the lens 1 is a heat caulking to the lens barrel 2 of the present embodiment, the average of eccentricity can be set to be less than 2 μm, and the eccentricity can be reduced substantially by half.

Additionally, in the lens assembly 10, the lens is pressed through the caulking and fixing portions 2D during heat caulking. Therefore, residual strain, particularly, in the vicinity of a region interposed by the caulking and fixing portions 2D and the lens-receiving surface 2a becomes large in the lens 1. By virtue of the symmetric property of the caulking and fixing portions 2D and the lens-receiving surface 2a that are abutment portions between the lens 1 and the lens barrel 2, this residual strain also has a distribution that is plane-symmetrical with respect to the planes S and T, respectively, and is axisymmetrical with respect to the central axis P.

For this reason, even if aberration degradation occurs due to the residual strain, aberration degradation that is plane-symmetrical in biaxial directions and aberration degradation that is axisymmetrical are obtained. As a result, since the balance of image quality does not collapse, these degradations are not easily conspicuous, and influence on image quality can be reduced compared to aberration degradation that is asymmetrically generated with the same amount.

FIRST MODIFIED EXAMPLE

Next, a first modified example of the present embodiment will be described.

Figure 4A:
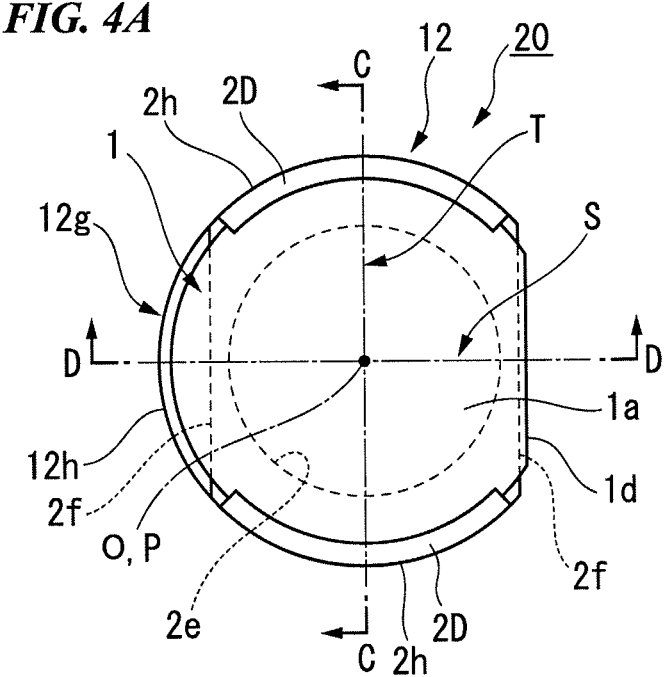
FIG. 4A is a schematic plan view showing the configuration of a lens assembly related to a first modified example of the embodiment of the present invention.
Figure 4B:
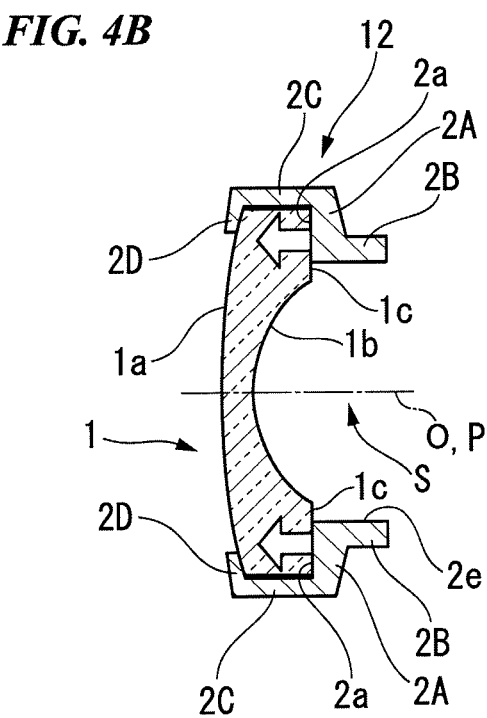
FIG. 4B is a C-C cross-sectional view of FIG. 4A.
Figure 4C:
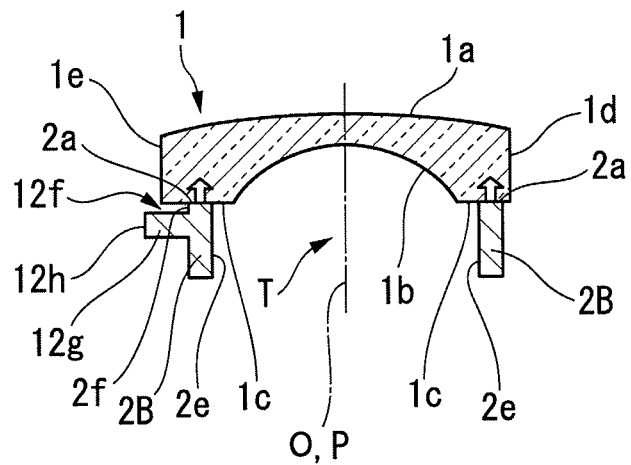
FIG. 4C is a D-D cross-sectional view of FIG. 4A.
Figure 5A:
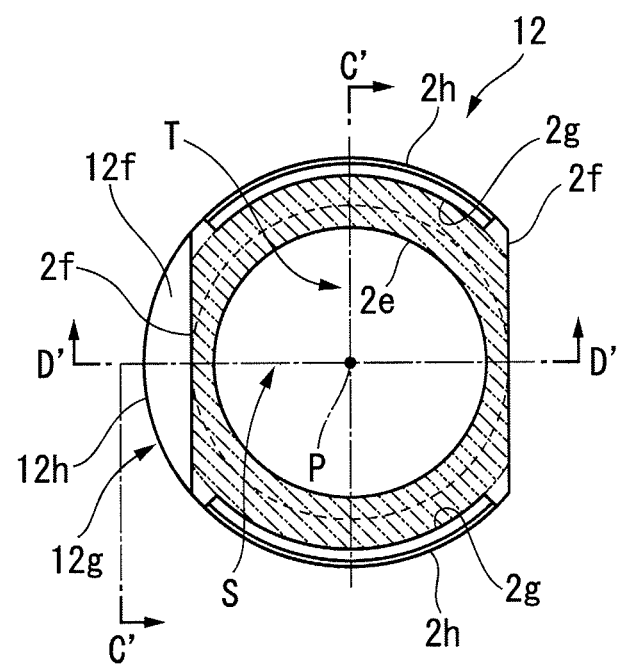
FIG. 5A is a schematic plan view showing the configuration of a lens barrel related to the first modified example of the embodiment of the present invention.
Figure 5B:
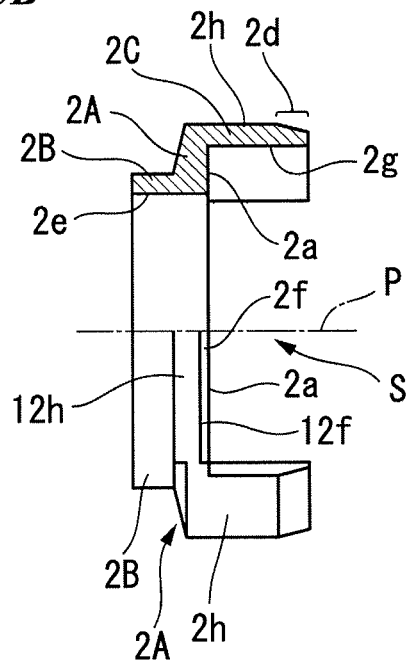
FIG. 5B is a C'-C' cross-sectional view of FIG. 5A.
Figure 5C:
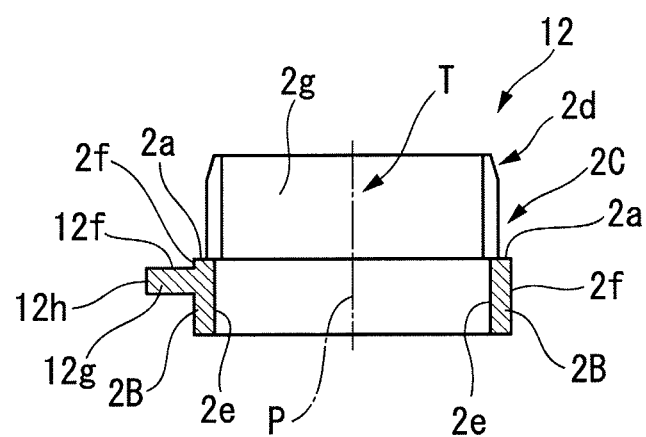
FIG. 5C is a D'-D' cross-sectional view of FIG. 5A.

FIG. 4A is a schematic plan view showing the configuration of a lens assembly related to the first modified example of the embodiment of the present invention. FIG. 4B and FIG. 4C are a C-C cross-sectional view and a D-D cross-sectional view in FIG. 4A, respectively. FIG. 5A is a schematic plan view showing the configuration of a lens barrel related to the first modified example of the embodiment of the present invention. FIG. 5B is a C'-C' cross-sectional view of FIG. 5A. FIG. 5C is a D'-D' cross-sectional view of FIG. 5A.

The lens assembly 20 of the present modified example, as shown in FIGS. 4A, 4B, and 4C, includes a lens barrel 12 instead of a lens barrel 2 in the lens assembly 10 of the above embodiment.

The lens barrel 12 of the present modified example, as shown in FIGS. 5A, 5B, and 5C, has a configuration in which a D-shaped projection portion 12g that overhangs radially outward from one planar side surface 2f of the lens barrel 2 of the above embodiment is provided.

Hereinafter, differences from the above embodiment will mainly be described.

The D-shaped projection portion 12g is a projection that includes a D-shaped outer shape having a minor arc as seen from a direction along the central axis P and that appropriately has a thickness in the direction along the central axis P. In the present embodiment, the thickness of the D-shaped projection portion 12g is provided with a constant thickness that is equal to the average thickness of molding as an example.

The projection portion outer peripheral surface 12h that is a tip surface of the D-shaped projection portion 12g in a protruding direction is a partial cylindrical surface aligned in the circumferential direction with the partial cylindrical surfaces that constitute the frame portion outer peripheral surfaces 2h, and both ends thereof in the circumferential direction are smoothly continuous with the frame portion outer peripheral surfaces 2h. For this reason, the projection portion outer peripheral surface 12h constitutes the reference outer shape of the lens assembly 20 together with the frame portion outer peripheral surfaces 2h, and can be used as the radial positioning reference surface or fixing surface of the lens assembly 20.

By virtue of such a configuration, the frame portion outer peripheral surfaces 2h and the projection portion outer peripheral surface 12h constitute a circular-arc reference surface that is formed in a major arc shape.

A stepped portion 12f in a shape that recedes further toward the cylinder portion 2B side than the lens-receiving surface 2a is formed on the surface of the D-shaped projection portion 12g on the lens insertion frame portions 2C side so that the attachment reference surface 1c of the lens 1 received by the lens-receiving surface 2a does not contact the D-shaped projection portion. An appropriate shape that recedes further toward the cylinder portion 2B side than the lens-receiving surface 2a can be used for the stepped portion 12f. In the present embodiment, the stepped portion 12f is constituted by a plane parallel to the lens-receiving surface 2a as an example.

The stepped portion between the D-shaped projection portion 12g and the lens-receiving surface 2a is formed by the planar side surfaces 2f.

The stepped portion 12f constitutes a space for preventing the lens 1 inserted into the lens insertion frame portions 2C and the D-shaped projection portion 12g from coming into contact with each other.

The lens barrel 12 of such a configuration can fix the lens 1 by the lens 1 being inserted into the lens insertion frame portions 2C similarly to the lens barrel 2 of the above embodiment, and then heat-caulking the caulking portions 2d by the heat-caulking apparatus 3 to form the caulking and fixing portions 2D.

Additionally, since the stepped portion 12f of the D-shaped projection portion 12g recedes further toward the cylinder portion 2B side than the lens-receiving surface 2a, the stepped portion does not come into contact with the lens 1 even if the lens 1 is pressed during heat caulking. For this reason, in the case of heat caulking, the attachment reference surface 1c of the lens 1 and the lens-receiving surface 2a abut against each other similarly to the above embodiment. Therefore, the lens 1 can be fixed with high precision by the heat caulking.

Additionally, in the lens assembly 20, the projection portion outer peripheral surface 12h of the D-shaped projection portion 12g constitutes a reference outer shape similarly to the frame portion outer peripheral surfaces 2h. For this reason, when the lens assembly 20 is positioned or mounted on a lens unit or an optical instrument, in addition to the frame portion outer peripheral surfaces 2h, the projection portion outer peripheral surface 12h can also be used as a positioning reference surface or fixing surface. Accordingly, compared to a case where only the frame portion outer peripheral surfaces 2h are used as the positioning reference surface or fixing surface, assembling error during mounting can be reduced, or attachment can be made easy.

Additionally, the D-shaped projection portion 12g overhangs so that the lens 1 is covered from the attachment reference surface 1c side as seen from the direction along the central axis P. Thereby, this lens assembly has a function of lens protection because exposure of the lens 1 is reduced compared to the lens assembly 10. That is, a possibility that a person's hand, a conveying device, a conveying jig, or the like comes into contact with the lens 1 directly or collides with the lens even during conveyance or the like, can be reduced.

SECOND MODIFIED EXAMPLE

Next, a second modified example of the present embodiment will be described.

Figure 6A:
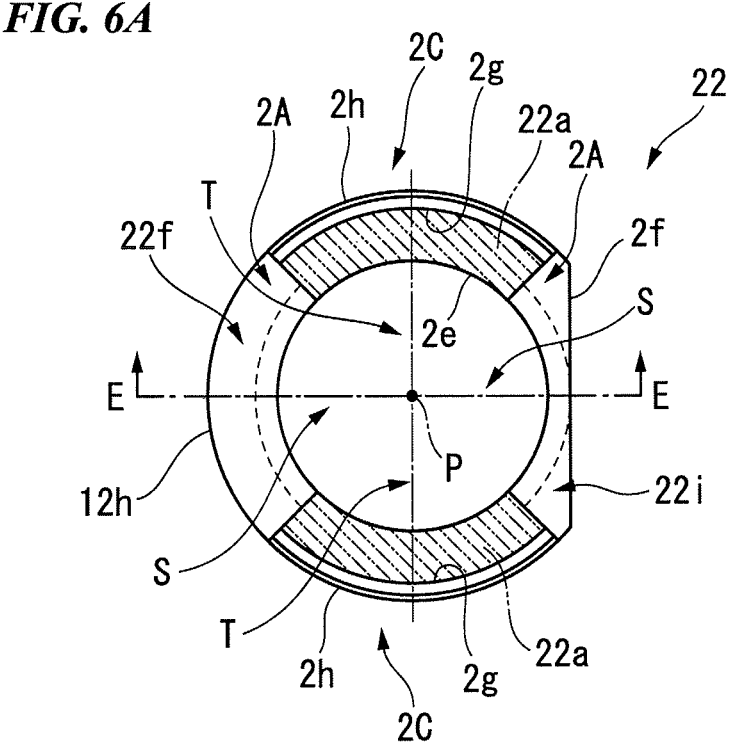
FIG. 6A is a schematic plan view showing the configuration of a lens barrel related to a second modified example of the embodiment of the present invention.
Figure 6B:
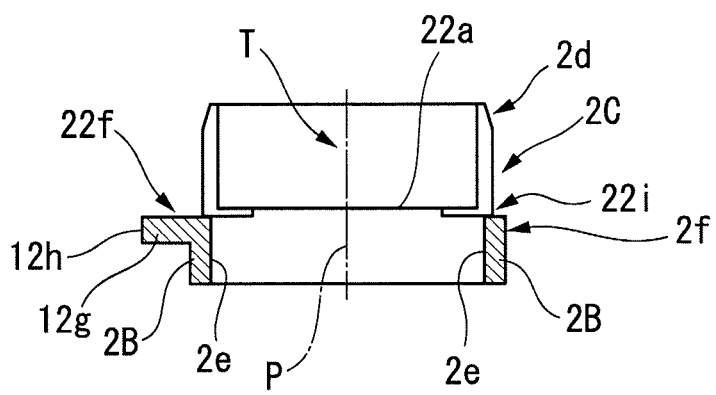
FIG. 6B is an E-E cross-sectional view of FIG. 6A.

FIG. 6A is a schematic plan view showing the configuration of a lens barrel related to the second modified example of the embodiment of the present invention. FIG. 6B is an E-E cross-sectional view in FIG. 6A.

A lens barrel 22 of the present modified example, as shown in FIGS. 6A and 6B, has a configuration in which one pair of lens-receiving surfaces 22a and a stepped portion 22f are provided instead of the lens-receiving surface 2a and stepped portion 12f of the lens barrel 12 of the above first modified example, and a stepped portion 22i is added. The lens barrel 22 can constitute a lens assembly by heat-caulking the lens 1 similarly to the lens barrel 12.

Hereinafter, differences from the above first modified example will mainly be described.

The pair of lens-receiving surfaces 22a are planes orthogonal to the central axis P, and are provided in circular-arc regions that become the insides of sectors in which the central angle with respect to the central axis P is equal to the central angle of the circular arcs of the lens insertion frame portions 2C between the respective insertion surfaces 2g of the pair of lens insertion frame portions 2C and the through hole 2e.

Both the stepped portions 22f and 22i are spaces provided in the surfaces of the D-shaped projection portion 12g and the flange portions 2A on the lens insertion frame portions 2C side so that the attachment reference surface 1c of the lens 1 inserted into the lens insertion frame portions 2C comes into contact with only the lens-receiving surfaces 22a.

The stepped portion 22f is provided in a shape that recedes further toward the cylinder portion 2B side than the lens-receiving surfaces 22a, in a region interposed in the circumferential direction by the pair of lens-receiving surfaces 22a, on the side where the D-shaped projection portion 12g is provided.

The stepped portion 22i is provided in a shape that recedes further toward the cylinder portion 2B side than the lens-receiving surfaces 22a, in a region interposed in the circumferential direction by the pair of lens-receiving surfaces 22a, on the regions of the flange portions 2A that face the stepped portion 22f across the central axis P.

Although the stepped portions 22f and 22i of the present modified example are constituted by planes parallel to the lens-receiving surfaces 22a as an example, the stepped portions are not limited to this configuration similarly to the stepped portion 12f of the above first modified example.

In this way, the lens barrel 22 is an example of a case where the lens barrel has a plurality of lens-receiving surfaces 22a and is not provided in the shape of a closed loop around the central axis P. Even with such a configuration, similarly to the lens barrel 2 of the above embodiment or the lens barrel 12 of the above first modified example, the lens 1 can be fixed with high precision by heat caulking because this lens barrel is formed in the region that is plane-symmetrical with respect to the planes S and T including the central axis P and orthogonal to each other.

Additionally, according to the present modified example, when the lens 1 is fixed, the attachment reference surface 1c that faces the stepped portions 22f and 22i does not receive a pressing force. Therefore, residual strain does not easily occur within the region of the lens 1 interposed by the pair of lens-receiving surfaces 22a.

THIRD MODIFIED EXAMPLE

Next, a third modified example of the present embodiment will be described.

Figure 7A:
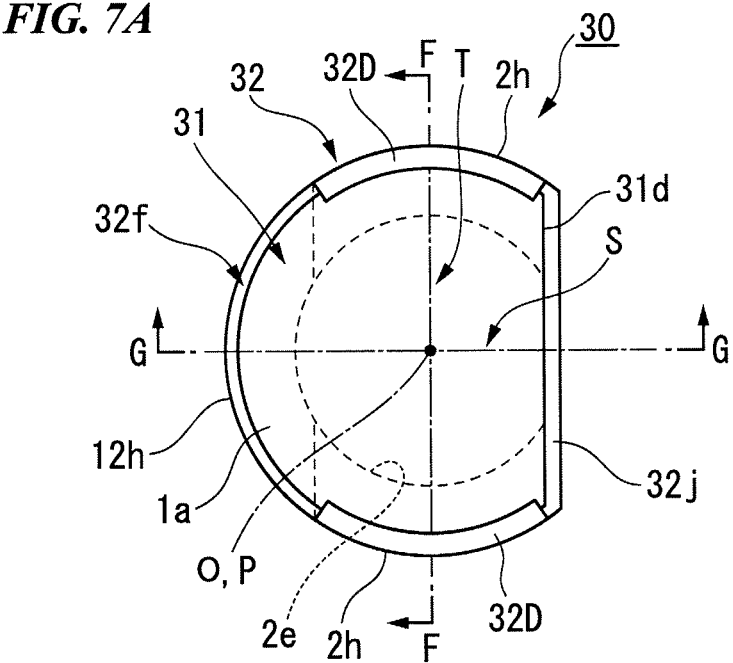
FIG. 7A is a schematic plan view showing the configuration of a lens assembly related to a third modified example of the embodiment of the present invention.
Figure 7B:
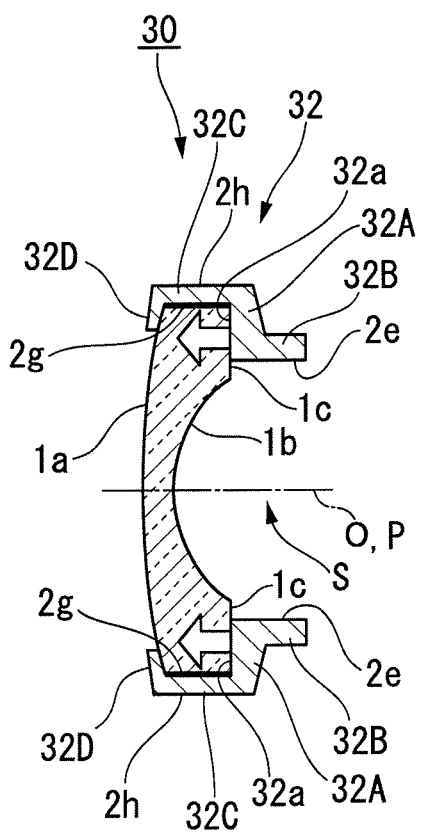
FIG. 7B is an F-F cross-sectional view of FIG. 7A.
Figure 7C:
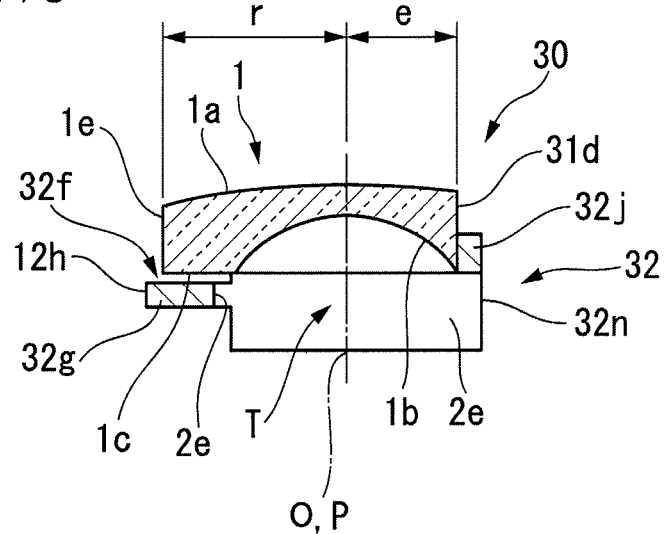
FIG. 7C is a G-G cross-sectional view of FIG. 7A.
Figure 8A:
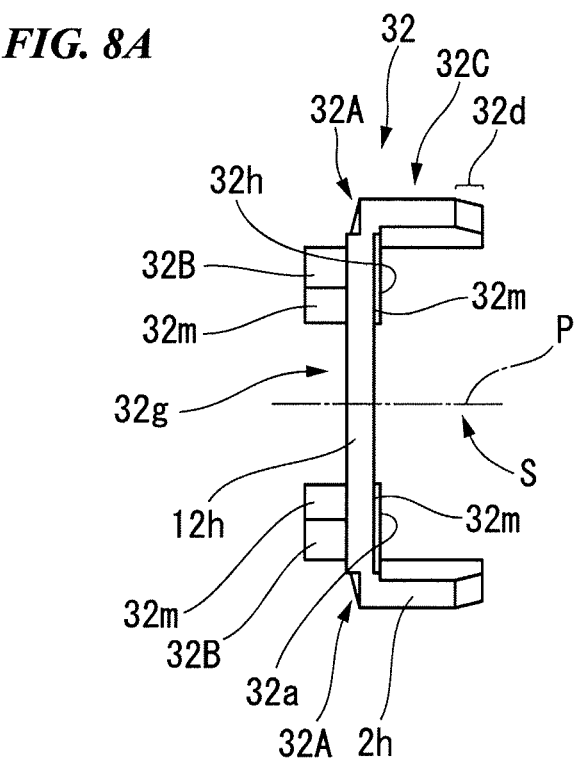
FIG. 8A is a schematic left side view showing the configuration of a lens barrel related to the third modified example of the embodiment of the present invention.
Figure 8B:
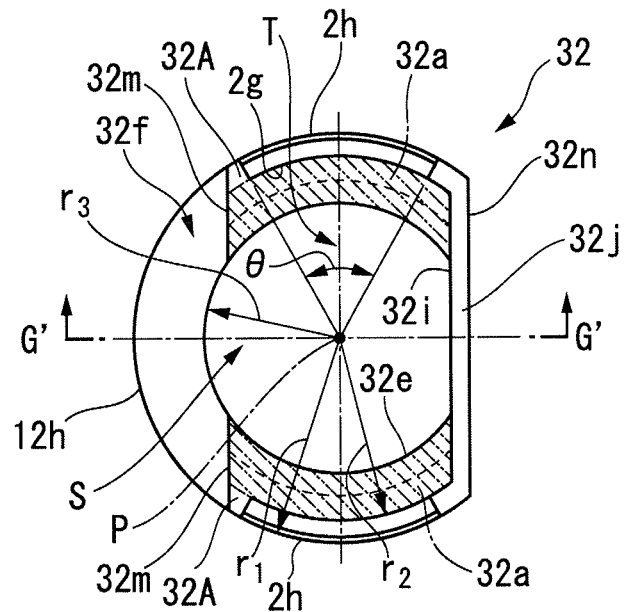
FIG. 8B is a plan view of the present modified example.
Figure 8C:
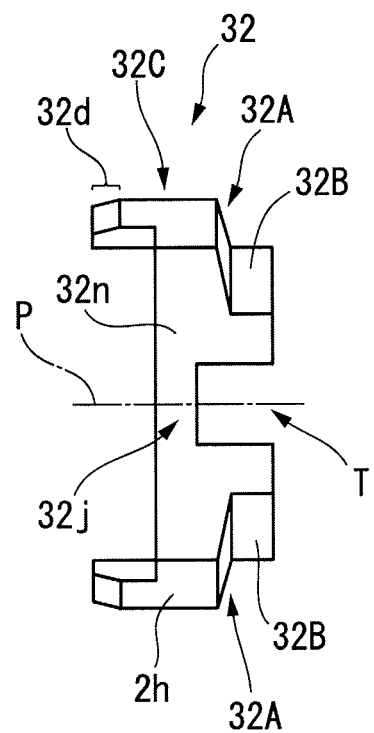
FIG. 8C is a right side view of the present modified example.
Figure 8D:
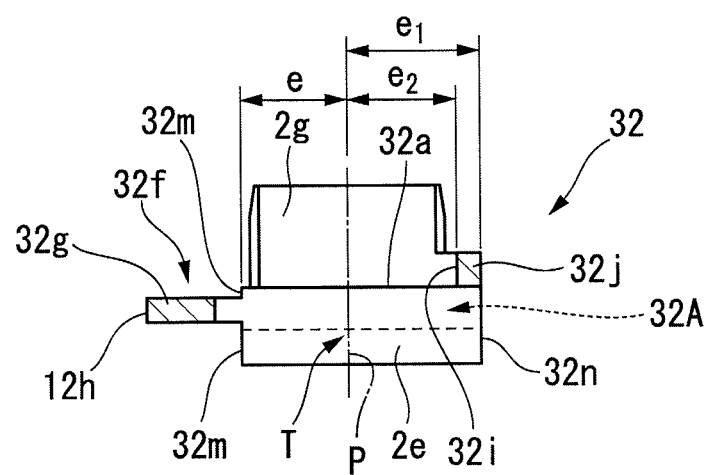
FIG. 8D is a G'-G' cross-sectional view in the plan view of FIG. 8B.

FIG. 7A is a schematic plan view showing the configuration of a lens assembly related to the third modified example of the embodiment of the present invention. FIG. 7B is an F-F cross-sectional view in FIG. 7A, and FIG. 7C is a G-G cross-sectional view in FIG. 7A. FIGS. 8A, 8B, and 8C are a schematic left side view, plan view, and right side view showing the configuration of a lens barrel related to the third modified example of the embodiment of the present invention. FIG. 8D is a G'-G' cross-sectional view in FIG. 8B.

The lens assembly 30 of the present modified example, as shown in FIGS. 7A, 7B, and 7C, is an assembly in which a lens 31 obtained by making the distance from the optical axis O of the D-cut surface 1d of the lens 1 smaller is a heat caulking in the thickness direction at the outer edge portion thereof and is fixed to a lens barrel 32. Caulking and fixing portions 32D show portions of the lens barrel 32 that are thermally deformed by heat caulking.

That is, the lens 31 has a configuration in which a plane parallel to the optical axis O is provided instead of the D-cut surface 1d of the lens 1 of the above embodiment, and the distance e from the optical axis O is e<d. The distance e may be, for example, equal to or less than an inner radius $d_1$ of the attachment reference surface 1c. Since the attachment reference surface 1c is divided in a circumferential direction by a D-cut surface 31d in the case of e<$d_1$, the attachment reference surface has a C-shape seen from a direction along the optical axis O.

In correspondence with such an outer shape of the lens 31, the lens barrel 32 has a configuration in which a pair of flange portions 32A, a pair of flange supporting frame portions 32B, a C-shaped projection portion 32g, and a pair of lens insertion frame portions 32C (side frame portions) are provided instead of the pair of flange portions 2A, the cylinder portion 2B, the D-shaped projection portion 12g, and the pair of lens insertion frame portions 2C of the lens barrel 12 of the above first modified example, and a D-cut insertion frame portion 32j (side frame portion) is added.

Hereinafter, differences from the above first modified example will mainly be described.

The pair of flange portions 32A, as shown in FIGS. 8A, 8B, 8C, and 8D, have a shape in which the width of the flange portions 2A of the above first modified example is narrowed in the direction orthogonal to the plane T.

That is, a planar side surface 32n is formed instead of the planar side surface 2f, at a position where the distance from the plane T becomes a distance $e_1$ (where e<$e_1$<$d_2$), on the side of the flange portions 32A where the D-cut surface 31d of the lens 31 is arranged.

Additionally, planar side surfaces 32m are formed instead of the planar side surface 2f at positions where the distance from the plane T becomes the distance e, on the opposite side of the flange portion 32A across the plane T.

Circular-arc plate-shaped flange supporting frame portions 32B that extend in the circumferential direction along the through hole 2e of the above first modified example and extend along the central axis P in a range interposed between the planar side surfaces 32m and 32n are connected to the flange portions 32A, respectively. The shape of the flange supporting frame portions 32B are equivalent to a shape obtained by excising portions, which are located outside the planar side surfaces 32m and 32n, in the cylinder portion 2B of the above first modified example.

The pair of flange portions 32A are coupled together by the C-shaped projection portion 32g in the circumferential direction in the planar side surfaces 32m, respectively. The C-shaped projection portion 32g is formed in a C-shape that overhangs radially outward from the planar side surfaces 32m, and has an appropriate thickness in the direction along the central axis P, similarly to the D-shaped projection portion 12g of the above first modified example.

The inner peripheral surface of the C-shaped projection portion 32g is a partial cylindrical surface with a radius $r_3$ where the through hole 2e that forms the inner peripheral surfaces of the flange supporting frame portions 32B extends.

The same projection portion outer peripheral surface 12h as the D-shaped projection portion 12g of the above first modified example is formed in the tip surface (outer peripheral surface) of the C-shaped projection portion 32g in the protruding direction. That is, the projection portion outer peripheral surface 12h is a partial cylindrical surface with the radius $r_1$ aligned with the frame portion outer peripheral surfaces 2h of the lens insertion frame portions 32C to be described below.

For this reason, the projection portion outer peripheral surface 12h constitutes the reference outer shape of the lens assembly 30 together with the frame portion outer peripheral surfaces 2h of the lens insertion frame portions 32C to be described below, and can be used as the radial positioning reference surface or fixing surface of the lens assembly 30.

Additionally, in the pair of flange portions 32A, the D-cut insertion frame portion 32j, which is a wall that is parallel to the plane T at a position that is aligned with each planar side surface 32n and in which the distance between the central axis P and the inner peripheral surface 32i is a distance $e_2$ (where $e_2 > e$) and the thicknesses is ($e_1 - e_2$), is installed on a surface opposite to the side where the flange supporting frame portions 32B are provided. The wall height of the D-cut insertion frame portion 32j is set to a dimension that becomes lower than the edge thickness h of the lens 31.

Here, the distance $e_2$ is set so that ($e - e_2$) becomes a dimension equivalent to a gap ($r_2 - r$) between the pair of lens insertion frame portions 2C and the lens side surface 1e of the lens 31 to be described below.

By virtue of such a configuration, the pair of flange portions 32A are coupled together in the facing direction by the C-shaped projection portion 32g and the D-cut insertion frame portion 32j.

For this reason, as seen from the central axis P, a D-shaped hole surrounded by the major arc with the radius $r_3$ and the inner peripheral surface 32i with the distance $e_2$ from the central axis P is formed inside the lens barrel 32.

The pair of lens insertion frame portions 32C extend along the central axis P on the surfaces of the pair of flange portions 32A opposite to the side where the flange supporting frame portions 32B are provided.

The pair of lens insertion frame portions 32C have configurations in which the width dimension, in the circumferential direction, of the lens insertion frame portions 2C of the above first modified example is shortened so as to fall within the range of the flange portions 32A. In the present modified example, the dimension of each lens insertion frame portion 32C in the circumferential direction is set to be $r_1 \cos(\theta/2) \leq e$ when the central angle with respect to the central axis P is defined as $\theta$, and each lens insertion frame portion is arranged at a position that is plane-symmetrical with respect to the plane T.

Caulking portions 32d that are different from the caulking portions 2d of the above first modified example only in circumferential length are provided at the tip portions of the respective lens insertion frame portions 32C. This forms the caulking and fixing portions 32D when heat caulking is performed.

The surfaces (also including regions that overlap the tips of flange supporting frame portions 32B) of the flange portions 32A where the lens insertion frame portions 32C are provided are constituted by planes orthogonal to the central axis P. Particularly, a pair of lens-receiving surfaces 32a that receive the attachment reference surface 1c of the lens 31 between the respective lens insertion frame portions 32C and the D-cut insertion frame portion 32j are formed in a region interposed by the planar side surfaces 32m and the inner peripheral surface 32i within a circle with the radius $r_2$ (where $r < r_2 < r_1$) centered on the central axis P. The respective lens-receiving surfaces 32a have a shape that is plane-symmetrical with respect to the planes S and T, respectively, and have a shape that is 180-degree axisymmetrical with respect to the central axis P.

Additionally, the C-shaped projection portion 32g constitutes a space with respect to the lens-receiving surfaces 32a, similarly to the D-shaped projection portion 12g of the above first modified example. Additionally, a stepped portion 32f in a shape that recedes further toward the flange supporting frame portions 32B side than the lens-receiving surfaces 32a is formed on the surface on the lens insertion frame portions 32C side so that the attachment reference surface 1c of the lens 1 received by the lens-receiving surfaces 32a does not come into contact. An appropriate shape that recedes further toward the flange supporting frame portions 32B side than the lens-receiving surfaces 32a can be used for the stepped portion 32f. In the present embodiment, the stepped portion 32f is constituted by a plane parallel to the lens-receiving surface 32a as an example.

The stepped portion between the C-shaped projection portion 32g and the lens-receiving surfaces 32a is formed by the planar side surfaces 32m.

The lens barrel 32 of such a configuration can fix the lens 31 by the lens 1 being inserted into the lens insertion frame portions 32C similarly to the lens barrel 2 of the above embodiment, and then heat-caulking the caulking portions 32d by the heat-caulking apparatus 3 to form the caulking and fixing portions 32D.

Additionally, since the stepped portion 32f of the C-shaped projection portion 32g recedes further toward the flange supporting frame portions 32B side than the lens-receiving surfaces 32a, the stepped portion does not come into contact with the lens 31 even if the lens 31 is pressed during heat caulking. For this reason, since the shape of the abutting surface between the attachment reference surface 1c of the lens 31 and the lens-receiving surfaces 32a is plane-symmetrical with respect to the planes S and T, and is 180° axisymmetrical with respect to the central axis P, the lens 31 can be fixed with high precision by heat caulking.

Additionally, in the lens assembly 30, similarly to the first modified example, the projection portion outer peripheral surface 12h of the C-shaped projection portion 32g constitutes a reference outer shape similarly to the frame portion outer peripheral surfaces 2h. For this reason, when the lens assembly 30 is positioned or mounted on a lens unit or an optical instrument, in addition to the frame portion outer peripheral surfaces 2h, the projection portion outer peripheral surface 12h can also be used as a positioning reference surface or fixing surface. Accordingly, compared to a case where only the frame portion outer peripheral surfaces 2h are used as the positioning reference surface or fixing surface, assembling error during mounting can be reduced, or attachment can be made easy.

Additionally, the C-shaped projection portion 32g overhangs so that the outer edge portion of the lens 31 is covered from the attachment reference surface 1c side as seen from the direction along the central axis P. Thereby, this lens assembly has a function of lens protection because exposure of the lens 1 is reduced compared to the lens assembly 10. That is, a possibility that a person's hand, a conveying device, a conveying jig, or the like comes into contact with the lens 31 directly or collides with the lens even during conveyance or the like, can be reduced.

FOURTH AND FIFTH MODIFIED EXAMPLES

Next, fourth and fifth modified examples of the present embodiment will be described. The fourth modified example and the fifth modified example are modified examples regarding the arrangement in a case where a lens barrel is provided with a plurality of lens-receiving surfaces. Respective lens barrels of the fourth and fifth modified examples can fix the lens 1 favorably to form a lens assembly, similarly to the lens barrel 2 of the above embodiment.

Hereinafter, differences from the above embodiment will mainly be described.

Figure 9A:
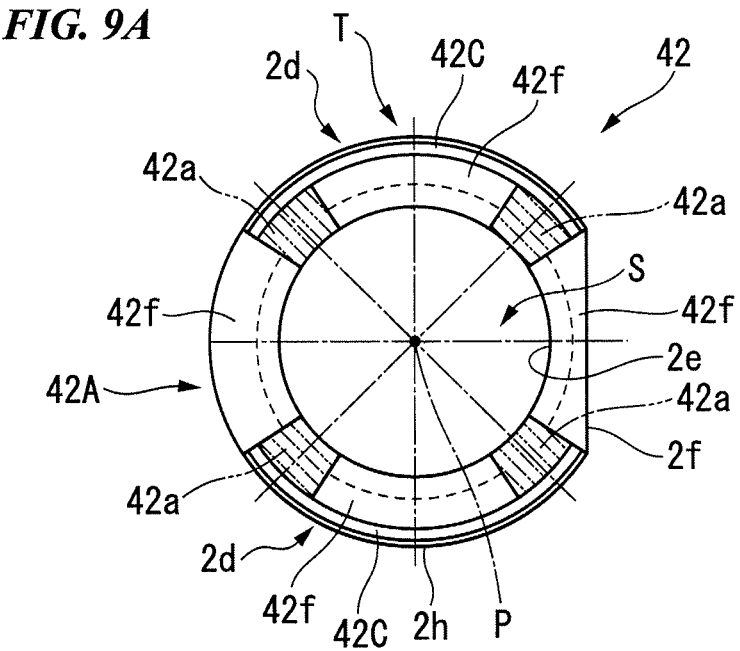
FIG. 9A is a schematic plan view showing the configuration of a lens barrel related to a fourth modified example of the embodiment of the present invention.
Figure 9B:
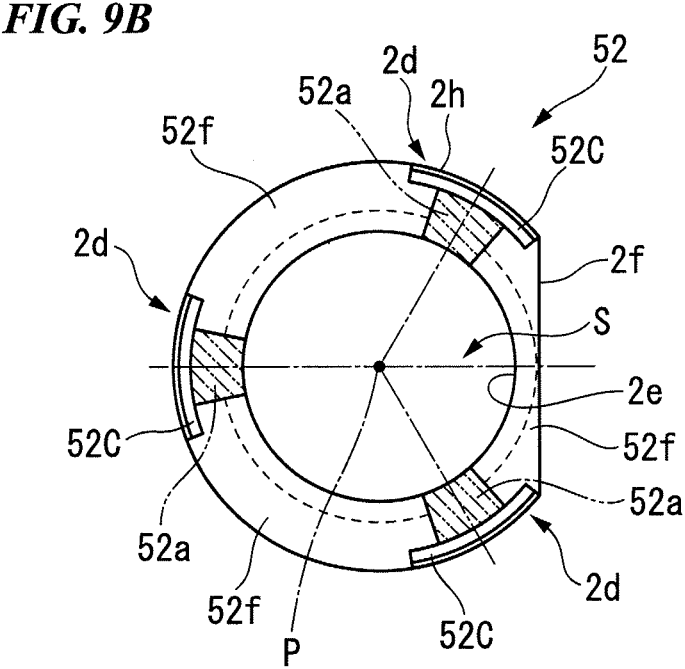
FIG. 9B is a schematic plan view showing the configuration of a lens barrel related to a fifth modified example of the embodiment of the present invention.

FIGS. 9A and 9B are schematic plan views showing the configuration of the lens barrels related to the fourth and fifth modified examples of the embodiment of the present invention.

In a lens barrel 42 of the fourth modified example, as shown in FIG. 9A, four lens-receiving surfaces 42a are provided at positions that is 90° axisymmetrical with respect to the central axis P, on a D-shaped flange portion 42A having one planar side surface 2f as a linear portion. The planar side surface 2f is formed at a position interposed by two adjacent lens-receiving surfaces 42a. For this reason, the respective lens-receiving surfaces 42a are arranged along a major arc-shaped side surface of the flange portion 42A.

Stepped portions 42f recessed from the lens-receiving surfaces 42a are formed as spaces when receiving the lens 1, respectively, between the respective lens-receiving surfaces 42a.

Additionally, a pair of lens insertion frame portions 42C that are bent in a circular-arc shape are provided on the flange portion 42A so as to be plane-symmetrical with respect to the plane S passing through the central axis P and orthogonal to the planar side surface 2f, that is, 180° axisymmetrical with respect to the central axis P. The shape of the lens insertion frame portions 42C is different from the lens insertion frame portions 2C of the above embodiment only in circumferential length, and in the present modified example, has a circumferential length such that two adjacent lens-receiving surfaces 42a can be covered from the radial outside. The same caulking portions 2d as the lens insertion frame portions 2C are provided at the tips (near side of the sheet plane of FIG. 9A) of the lens insertion frame portions 42C in the protruding direction.

By virtue of such a configuration, the lens barrel 42 has the caulking portions 2d that are 180° axisymmetrical with respect to the central axis P, and the lens-receiving surfaces 42a that are 90° axisymmetrical with respect to the central axis. Therefore, the lens barrel can fix the lens 1 with high precision by caulking similarly to the above embodiment.

In a lens barrel 52 of the fifth modified example, as shown in FIG. 9B, third lens-receiving surfaces 52a are provided at positions, which are 120° axisymmetrical with respect to the central axis P, on a D-shaped flange portion 52A having one planar side surface 2f as a linear portion. The planar side surface 2f is formed at a position interposed by two adjacent lens-receiving surfaces 52a. For this reason, the respective lens-receiving surfaces 52a are arranged along a major arc-shaped side surface of the flange portion 52A.

Stepped portions 52f recessed from the lens-receiving surfaces 52a are formed as spaces when receiving the lens 1, respectively, between the respective lens-receiving surfaces 52a.

Additionally, three lens insertion frame portions 52C that are bent in a circular-arc shape are provided on the flange portion 52A so as to be 120° axisymmetrical with respect to the central axis P in correspondence with the arrangement of the lens-receiving surfaces 52a. The shape of the lens insertion frame portions 52C is different from the lens insertion frame portions 2C of the above embodiment only in circumferential length, and in the present modified example, has a circumferential length such that each lens-receiving surface 52a can be covered from the radial outside. The same caulking portions 2d as the lens insertion frame portions 2C are provided at the tips (near side of the sheet plane of FIG. 9B) of the lens insertion frame portions 52C in the protruding direction.

By virtue of such a configuration, the lens barrel 52 has the caulking portions 2d that are 120° axisymmetrical with respect to the central axis P, and the lens-receiving surfaces 52a that are 120° axisymmetrical with respect to the central axis. Therefore, the lens barrel can fix the lens 1 with high precision by caulking similarly to the above embodiment.

The present modified example is an example of a case where the lens-receiving surfaces are provided at axisymmetrical positions that are not plane-symmetrical with respect to two planes orthogonal to each other.

In addition, although a case where the caulking and fixing portions press the outer edge portion of the first lens surface has been described as an example in the above description, a lens may have a configuration in which a flange portion for attachment having a reference outer shape is formed at an outer edge portion.

Additionally, although a case where one lens is fixed to the lens barrel has been described as an example in the above description, for example, a configuration in which a lens barrel includes lens-receiving surfaces on the front and rear thereof, separate lens insertion frame portions are provided from the respective lens-receiving surface sides, and two lenses are fixed to the front and back of the lens barrel may be adopted.

Additionally, in the above description, a case where the lens side surface has a D-shaped outer shape divided in one place by a plane parallel to the optical axis has been described as an example of a lens whose outer shape, as seen from the direction along the optical axis, is formed by a circular-arc shape and a linear shape. This is an example of a case where the linear shape is provided in one place. There may be two or more linear shape portions, and the divided shape is not limited to the plane parallel to the optical axis. A plane that is not parallel to the optical axis may also be adopted.

Additionally, although the outer shape seen from the direction along the optical axis of the lens may be a shape axisymmetrical with respect to the optical axis, the present embodiment is particularly preferable in a case where the outer shape is not axisymmetrical.

Additionally, a case where, when the lens barrel includes a D-shaped projection portion or a C-shaped projection portion, the projection portion is formed in the shape of a plate, and the reference outer shape is provided at a tip portion of the projection portion has been described as an example in the above description. However, a cylindrical side wall surface that is long extending along the central axis of the lens barrel may be formed and a reference outer shape that is long in the axial direction may be formed. That is, in the lens barrels 12, 22, and 32, the lens insertion frame portions 2C and 32C may extend in the circumferential direction on the D-shaped projection portion 12g and the C-shaped projection portion 32g, respectively, and may be coupled to each other so as to constitute the side frame portions in which a shape seen from the direction along the central axis P is C-shaped.

Additionally, since a case where the attachment reference surface of the lens is constituted by a plane orthogonal to the optical axis is given as an example in the above description, a case where the lens-receiving surface is formed as a plane orthogonal to the central axis P has been described as an example. However, the lens-receiving surface may extend in the direction intersecting the central axis P according to the shape of the attachment reference surface of the lens, and is not limited to a plane orthogonal to the central axis P.

For example, in a case where the attachment reference surface of the lens has a convex or concave lens surface, shapes, such as an inclined surface that is a tangential plane of the lens surface, and a conical surface that becomes a tangential curved surface, can be adopted.

Additionally, although a case where the overall lens barrel is formed from a thermoplastic resin has been described as an example in the above description, only a portion including a portion to be a heat caulking may be constituted from a thermoplastic resin, and other portions may be constituted from different materials, such as a thermosetting resin or a metal. In such a configuration, the degree of freedom in shape can be improved because it is unnecessary to make the average thickness constant.

Additionally, although a case where the lens is fixed to the lens barrel by heat caulking has been described as an example in the above description, metal caulking may be adopted in a case where the load to the lens can be permitted.

Additionally, all the constituent elements described in the above embodiment and the respective modified examples can be carried out by appropriate combination or deletion in the scope of the technical idea of the present invention.

According to the lens barrel and lens assembly of the present invention, the balance of forces that act on the lens during caulking becomes excellent by providing the lens-receiving surface axisymmetrically with respect to the central axis. Thereby, for example, in a case where the lens whose outer shape seen from the direction along the optical axis is formed by a circular-arc shape and a linear shape is fixed by caulking, the effect that the lens can be fixed with high precision is exhibited.

While preferred embodiments of the present invention have been described, the present invention is not limited to the embodiments. Additions, omissions, substitutions, and other variations may be made to the present invention without departing from the spirit and scope of the present invention. The present invention is not limited by the above description, but by the appended claims.

The invention claimed is:

1. A lens barrel for supporting a lens such that the optical axis of the lens is aligned with a central axis of the lens barrel, the lens barrel comprising:
   (a) a lens receiving surface which extends perpendicular to the central axis, the lens receiving surface being symmetrical about the central axis and having an outer periphery including:
      (1) first and second circular portions extending in a circular arc centered on the central axis and facing one another across the central axis; and
      (2) first and second cut out portions facing one another across the central axis; and
   (b) a pair of side frame portions extending axially from the first and second circular portions, respectively, the first and second side frame portions facing each other across the central axis and extending in circular arcs centered on the central axis, each side frame portion:
      (1) including a caulking portion on its distal end, the caulking portion being made of a material that allows it to be deformed by external pressure so that when the lens, that is formed in an arc shape that is greater than a semicircle, is placed on the lens receiving surface and the caulking portions are so deformed, the lens will be fixed between the deformed caulking portions and the lens receiving surface; and
      (2) an outer peripheral surface extending in a circular-arc that is coaxial with the central axis.

2. The lens barrel according to claim 1, wherein the lens-receiving surface is formed in a shape of a closed loop around the central axis.

3. The lens barrel according to claim 1, wherein a plurality of the lens-receiving surfaces are formed at positions that face each other across the central axis.

4. The lens barrel according to claim 1, wherein the lens is fixed by being formed from a thermoplastic resin and heat-caulking the caulking portion.

5. A lens assembly comprising:
the lens barrel according to claim 1, and a lens, wherein an outer shape of the lens seen from a direction along the optical axis is formed by a circular-arc shape and a linear shape, and the lens is caulked and fixed by the caulking portions of the lens barrel.

6. A lens barrel for supporting a lens such that the optical axis of the lens is aligned with a central axis of the lens barrel, the lens barrel comprising:
   (a) a lens receiving surface which extends perpendicular to the central axis, the lens receiving surface being symmetrical about the central axis and having an outer periphery including:
      (1) a circular portion extending in a circular arc centered on the central axis; and
      formed in a major arc shape portion that is greater than a semicircle,
      (2) a cut out portion; and
   b) a pair of side frame portions extending axially from the circular portion, the first and second side frame portions facing each other across the central axis and extending in circular arcs centered on the central axis, each side frame portion:
      (1) including a caulking portion on its distal end, the caulking portion being made of a material that allows it to be deformed by external pressure so that when the lens, that is formed in a major arc shape that is greater than a semicircle, is placed on the lens receiving surface and the caulking portions are so deformed, the lens will be fixed between the deformed caulking portions and the lens receiving surface; and
      (2) an outer peripheral surface extending in a circular-arc that is coaxial with the central axis.

* * * * *